US012710406B2

(12) United States Patent
Cox et al.

(10) Patent No.: US 12,710,406 B2
(45) Date of Patent: Aug. 18, 2026

(54) CHROMATOGRAPHIC-LIKE SEPARATION USING SAMPLE DROPLET EJECTION

(71) Applicant: DH TECHNOLOGIES DEVELOPMENT PTE. LTD., Singapore (SG)

(72) Inventors: David Cox, Concord (CA); Chang Liu, Concord (CA)

(73) Assignee: DH Technologies Development Pte. Ltd., Singapore (SG)

( * ) Notice: Subject to any disclaimer, the term of this patent is extended or adjusted under 35 U.S.C. 154(b) by 391 days.

(21) Appl. No.: 18/294,348

(22) PCT Filed: Aug. 4, 2022

(86) PCT No.: PCT/IB2022/057271
§ 371 (c)(1),
(2) Date: Feb. 1, 2024

(87) PCT Pub. No.: WO2023/012724
PCT Pub. Date: Feb. 9, 2023

(65) Prior Publication Data

US 2024/0345044 A1 Oct. 17, 2024

Related U.S. Application Data

(60) Provisional application No. 63/230,336, filed on Aug. 6, 2021.

(51) Int. Cl.
*G01N 30/72* (2006.01)
*G01N 30/02* (2006.01)
(Continued)

(52) U.S. Cl.
CPC ........... *G01N 30/724* (2013.01); *G01N 30/02* (2013.01); *G01N 30/06* (2013.01); *H01J 49/0454* (2013.01); *G01N 2030/027* (2013.01)

(58) Field of Classification Search
CPC ...... G01N 30/724; G01N 30/02; G01N 30/06; G01N 2030/027; G01N 30/72; H01J 49/0454
See application file for complete search history.

(56) References Cited

U.S. PATENT DOCUMENTS 7,186,973 B2 * 3/2007 Terui .................. H01J 49/0031 250/281
2014/0069176 A1 * 3/2014 Liu ....................... G01N 30/34 210/656

(Continued)

FOREIGN PATENT DOCUMENTS

WO 2019102350 A1 5/2019
WO WO-2023012724 A1 * 2/2023 .......... H01J 49/0454

OTHER PUBLICATIONS

International Preliminary Report on Patentability, for PCT Patent Application No. PCT/IB2022/057271 mailed Feb. 15, 2024, 7 pages.

(Continued)

*Primary Examiner* — David A Vanore
(74) *Attorney, Agent, or Firm* — Lathrop GPM LLP; Malaika O.D. Tyson; Jason Kuchar

(57) ABSTRACT

Disclosed are methods for separating target and non-target analytes in a sample. The methods can utilize an acoustic droplet ejector (ADE) and an open port interface (OPI) to achieve liquid chromatography (LC)-like separation for an analytical instrument such as, for example, a mass spectrometer.

20 Claims, 4 Drawing Sheets

(51) Int. Cl.
*G01N 30/06* (2006.01)
*H01J 49/04* (2006.01)

(56) References Cited

U.S. PATENT DOCUMENTS

| | | | | |
|---|---|---|---|---|
| 2019/0157061 | A1 | 5/2019 | Datwani et al. | |
| 2024/0053356 | A1* | 2/2024 | Liu | G01N 33/68 |
| 2024/0345044 | A1* | 10/2024 | Cox | G01N 30/06 |
| 2025/0083070 | A1* | 3/2025 | Xu | B01D 15/10 |

OTHER PUBLICATIONS

International Search Report and Written Opinion for PCT Patent Application No. PCT/IB2022/057271 mailed Nov. 7, 2022.

Manisali et al., "Electrospray Ionization Source Geometry for Mass Spectrometry: Past, Present, and Future", TRAC Trends in Analytical Chemistry, Elsevier Amsterdam, NL. vol. 25, No. 3. Mar. 1, 2006, pp. 243-256, XP027892004, ISSN: 0165-9936.

* cited by examiner

FIG. 2A

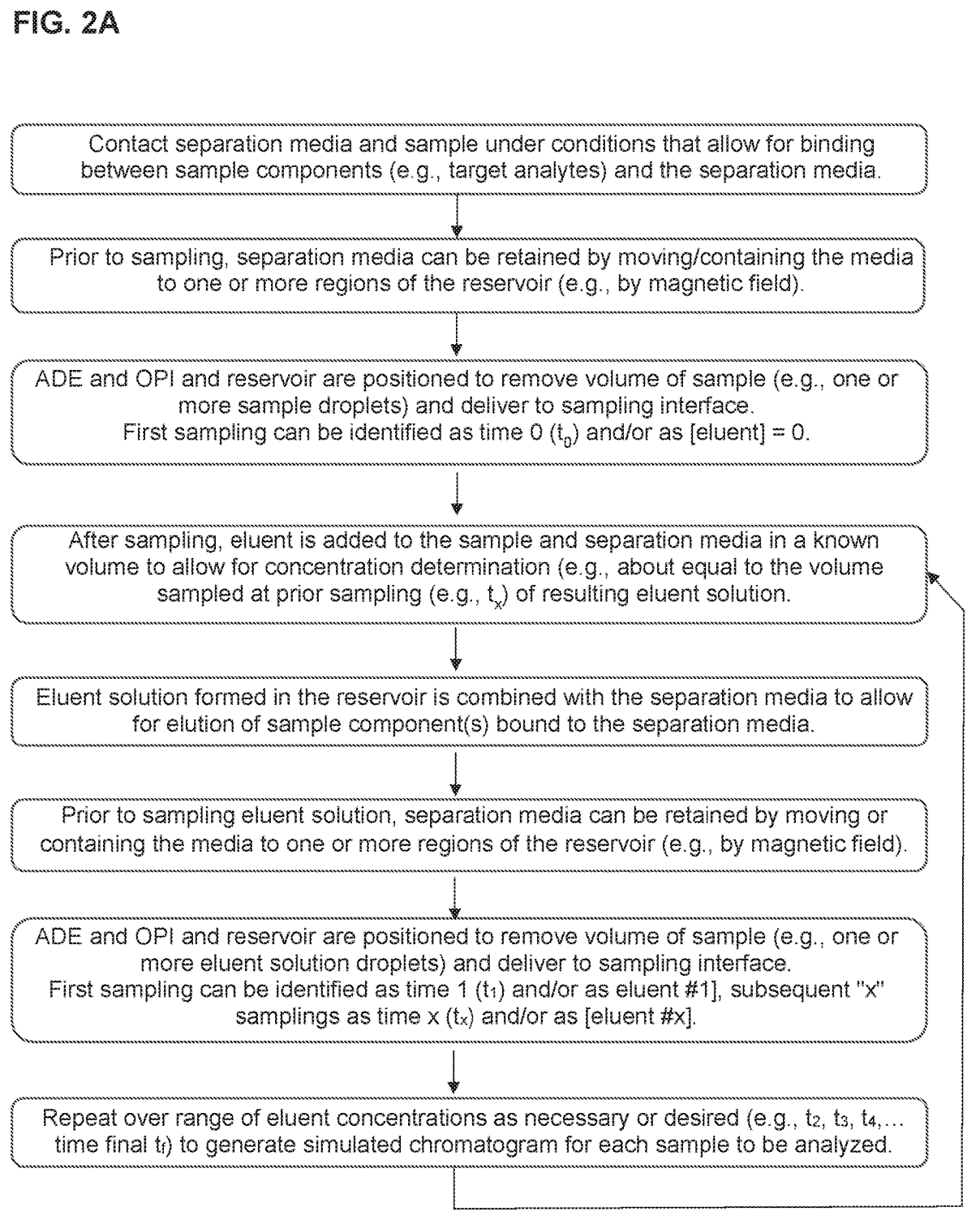

Contact separation media and sample under conditions that allow for binding between sample components (e.g., target analytes) and the separation media.

↓

Prior to sampling, separation media can be retained by moving/containing the media to one or more regions of the reservoir (e.g., by magnetic field).

↓

ADE and OPI and reservoir are positioned to remove volume of sample (e.g., one or more sample droplets) and deliver to sampling interface.
First sampling can be identified as time 0 ($t_0$) and/or as [eluent] = 0.

↓

After sampling, eluent is added to the sample and separation media in a known volume to allow for concentration determination (e.g., about equal to the volume sampled at prior sampling (e.g., $t_x$) of resulting eluent solution.

↓

Eluent solution formed in the reservoir is combined with the separation media to allow for elution of sample component(s) bound to the separation media.

↓

Prior to sampling eluent solution, separation media can be retained by moving or containing the media to one or more regions of the reservoir (e.g., by magnetic field).

↓

ADE and OPI and reservoir are positioned to remove volume of sample (e.g., one or more eluent solution droplets) and deliver to sampling interface.
First sampling can be identified as time 1 ($t_1$) and/or as eluent #1], subsequent "x" samplings as time x ($t_x$) and/or as [eluent #x].

↓

Repeat over range of eluent concentrations as necessary or desired (e.g., $t_2$, $t_3$, $t_4$,… time final $t_f$) to generate simulated chromatogram for each sample to be analyzed.

CHROMATOGRAPHIC-LIKE SEPARATION USING SAMPLE DROPLET EJECTION

RELATED APPLICATIONS

The present application is filed pursuant to 35 U.S.C. 371 as a U.S. National Phase application of International Patent Application No. PCT/IB2022/057271, which was filed Aug. 4, 2022, claiming the priority benefit of U.S. Provisional Patent Application Ser. No. 63/230,336, filed Aug. 6, 2021, the content of which is hereby incorporated by reference in its entirety into this disclosure.

BACKGROUND

Traditional liquid chromatography techniques may be combined with one or more analytical techniques to detect, characterize, quantify, and identify target analytes in a sample. For example, mass spectrometry (LC-MS) is an analytical chemistry technique that combines the analyte separation of liquid chromatography with the mass analysis and structural identification of analytes via mass spectrometry. While chromatographic separations of sample components is a powerful technique and can provide a number of useful features (e.g., matrix exchange, component separation, etc.) it can be slow and cumbersome to operatively combine with additional analytical instructions (i.e., LC-MS analysis is a time-consuming method). Although throughput can be increased by operating multiple LC systems in parallel (e.g., LC-MS systems), this is typically an expensive and labor-intensive option. Coupling multiple LC systems to an instrument such as a single MS detector can increase throughput, but it also introduces unwanted carry-over between samples, and is typically limited to multiplexing no more than two LC systems. Accordingly, there is a need for alternative methods and techniques that can provide the advantages of chromatography-like separation of analytes (e.g., for mass analysis), without the need to employ an LC system.

SUMMARY

In an aspect, the disclosure provides a method comprising:

- combining separation media with a sample solution;
- separating the separation media from the sample solution;
- retaining the separation media in a reservoir containing an eluent to form an eluent solution having an eluent concentration;
- generating a synthetic chromatogram by repeatedly: ejecting a volume of eluent solution from the reservoir into a sampling interface, capturing the volume of eluent solution with the sampling interface and transferring the captured volume to a mass spectrometer for mass analysis, mass analyzing eluent ions, and increasing the eluent concentration of the eluent solution until a target concentration is reached.

In another aspect, the disclosure provides a method comprising:

- combining separation media with a sample solution;
- separating the separation media from the sample solution;
- retaining the separation media in a plurality of reservoirs, each reservoir containing a different concentration of an eluent to form a plurality of eluent solutions at different eluent concentrations;
- generating a synthetic chromatogram by: sequentially ejecting from each reservoir of the plurality of reservoirs a volume of eluent solution into a sampling interface, capturing the volume of eluent solution with the sampling interface and transferring the captured volume to a mass spectrometer to generate eluent ions for mass analysis, and mass analyzing the eluent ions.

In embodiments of the aspects described herein, the volume of eluent solution is ejected using an acoustic droplet ejector (ADE), a microinjector, a nanoinjector, or an inkjet printer nozzle. In further embodiments the eluent solution is ejected using an ADE. In some embodiments, the ejecting comprises ejecting one or more discrete droplets of eluent solution. In some embodiments the volume of ejected eluent solution that is captured can further comprise diluting the captured volume of eluent solution.

Some embodiments of the methods described herein can comprise one or more sampling interfaces, which may include an open port interface (OPI) or an acoustic mist ionization interface.

In some embodiments of the methods, increasing the concentration of the eluent solution comprises adding eluent to the eluent solution. In some further embodiments the volume of the eluent solution is maintained to be about the same during the method. In yet further embodiments, increasing the eluent concentration of the eluent solution further comprises mixing the separation media. In yet other embodiments one or more of a plurality of reservoirs may comprise eluent solutions at different concentrations, where in the concentration of the eluent solution in one or more of the plurality of reservoirs may be modified (increased or decreased) by adding eluent or by adding a solution that does not include an eluent.

Embodiments of the methods described herein can comprise mixing in one or more of the reservoirs. In some embodiments, combining separation media with sample solution comprises mixing. In further embodiments, retaining the separation media in a reservoir or a plurality of reservoirs containing an eluent comprises mixing. In such embodiments, the mixing may comprise electromagnetic mixing, mechanical agitation, or acoustic agitation performed in the reservoir.

In various embodiments of the methods provided by the disclosure, the separation media comprises solid phase media comprising a particle having an active surface coating or a resin. In embodiments, the separation media comprises an ion exchange moiety, a chelating moiety, a hydrophobic moiety, an affinity moiety, or a size exchange moiety. The separation media can comprise polymeric and/or particulate media of various sizes and shapes (e.g., of about 100 microns or less in its largest dimension). In some embodiments, the separation media can comprise a microparticle or a nanoparticle. In some further embodiments, the separation media can comprise a magnetic particle.

In embodiments, the separation media can comprise a material that provides for the retaining of the media in one or more reservoirs. In some embodiments, the method includes a retaining step that comprises applying a magnetic field to the sample reservoir or other receptacle that contains and/or holds sample.

The methods provided by the disclosure can achieve chromatographic-like separation of sample components by contacting separation media with an eluent at various concentrations. In some embodiments, the eluent comprises an organic compound, an ionic solution, or a binding agent that binds to an affinity resin or an active surface coating that is present on the separation media. In embodiments, the methods comprise varying the concentration of the eluent in one or more eluent solutions, wherein increasing the eluent concentration of an eluent solution can comprise adding eluent to the reservoir. In other embodiments, diluting the eluent concentration of an eluent solution can comprise adding an amount of a solution that does not comprise eluent to the reservoir. In such embodiments, the addition of eluent and/or other solutions can comprise an acoustic ejector, a microinjector, a nanoinjector, or an inkjet printer nozzle. In embodiments, the eluent solution and the eluent solution comprising added eluent (or added solution without eluent) have about the same volume throughout the method.

In embodiments of the methods, the volume of ejected sample may range from about 2.5 nL to about 500 nL.

In some embodiments of the methods, the reservoir or plurality of reservoirs comprises a sample well plate operatively configured and/or addressable to an ADE.

In embodiments of any of the methods disclosed herein, the mass analyzing comprises a mass spectrum. In further embodiments of such methods, the methods may further comprise a differential mobility spectrometer (DMS) for ion selection.

In some embodiments, the methods disclosed herein are effective to reduce ion suppression and/or ion interferences in the mass analysis or mass spectrum. In some embodiments, the methods disclosed herein can provide for separates two or more components in the sample solution. In further embodiments, the methods can comprise the characterization and/or identification of one or more sample components.

Other aspects and embodiments of the disclosure will be apparent in light of the description and illustrative examples that follow.

BRIEF DESCRIPTION OF THE DRAWINGS

FIGS. 2A-2B depict a workflow of methods and systems in accordance with example aspects and embodiments of the disclosure. FIG. 2A provides example process workflow steps. FIG. 2B depicts an embodiment comprising an ADE and OPI.

DETAILED DESCRIPTION

Figure 1A:
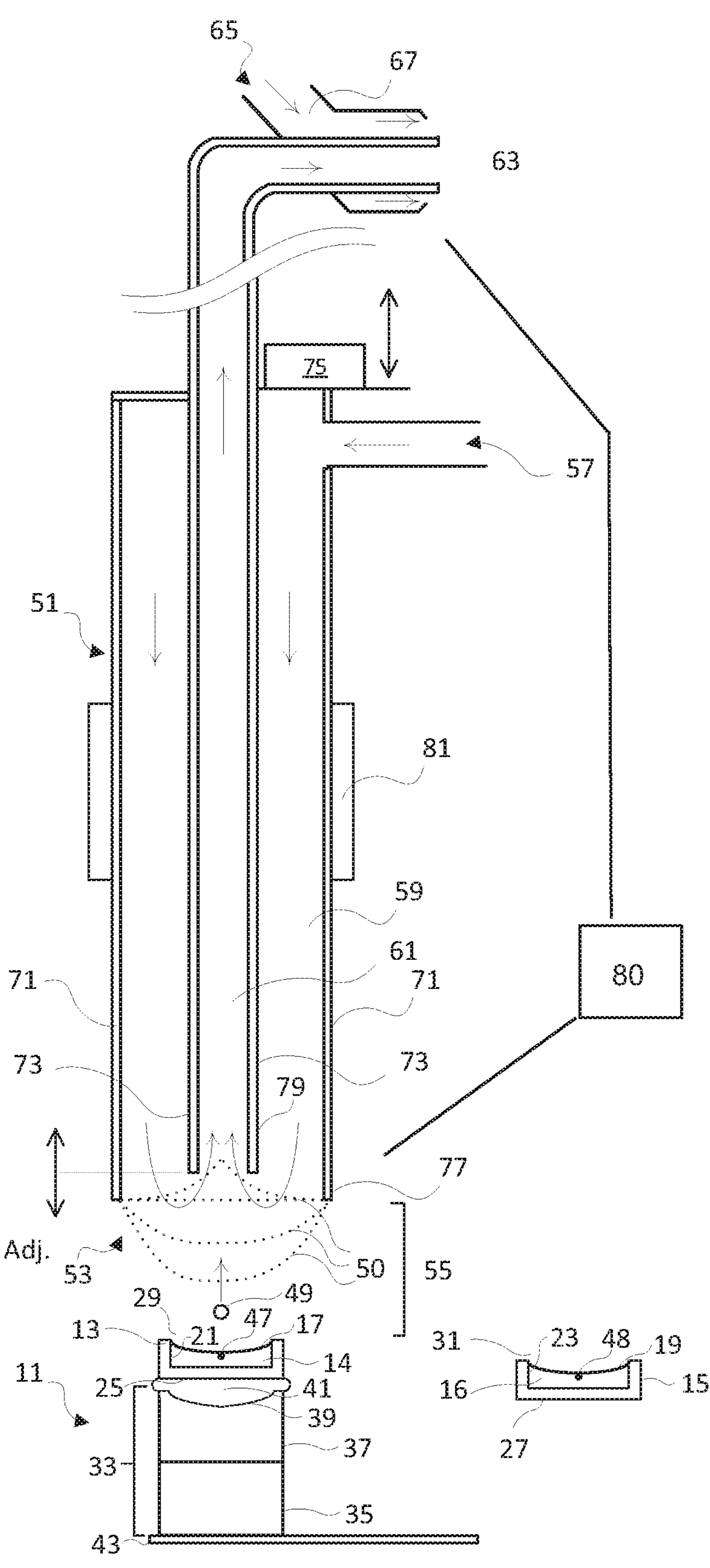
FIGS. 1A-1B illustrate an open port interface (OPI) sampling interface and an acoustic droplet ejection (ADE) device in accordance with some example aspects and embodiments of the disclosure.

It is to be understood that this disclosure is not limited to the particular methodology, protocols, and reagents described herein and as such may vary. It is also to be understood that the terminology used herein is for the purpose of describing particular embodiments only and is not intended to limit the scope of the present disclosure or the appended claims.

As used herein and in the appended claims, the singular forms "a," "an," and "the" include plural reference unless the context clearly indicates otherwise.

The term "about" is used in connection with a numerical value throughout the specification and the claims denote an interval of accuracy, familiar and acceptable to a person skilled in the art. In general, such an interval of accuracy is +/−10%.

Unless defined otherwise, all technical and scientific terms used herein have the same meaning as commonly understood to one of ordinary skill in the art to which this disclosure belongs.

The disclosure generally provides methods for chromatographic-like separation of target and non-target analytes in a sample without the need of a chromatography system. More specifically, the disclosure provides methods for achieving liquid chromatography (LC)-like separation on an acoustic ejection mass spectrometer (AEMS). As used herein "LC-like separation" or generating a "synthetic chromatogram" refer to the separation of two or more components present in a sample through the use of separation media and one or more eluent solutions under conditions that provide for the separation of components (e.g., analytes) that can be detected as a function of concentration of eluent in the one or more eluent solutions. If desired, the separation of components may be represented, depicted, or visualized as a plot, trace, graph, etc., of the presence, amount, or concentration, etc. of the one or more separated components as a function of eluent concentration, similar to a typical trace associated with chromatographic separations.

The methods can provide for contacting one or more samples—which may be unprocessed, raw, or crude samples, or may be samples that are pre-processed through one or more preparative steps—with a separation medium under conditions effective to bind one or more components in the sample. In embodiments, the separation media can be retained in a reservoir, or the separation media can be removed from reservoir, and is contacted with a solution having a known amount of an eluent to form an eluent solution. A volume of the eluent solution is introduced to a sampling interface and is transferred to one or more analytical devices for analysis. The methods comprise varying the eluent concentration in the eluent solution, or comprise a plurality of eluent solutions at various eluent concentrations that are each sampled and analyzed for the presence of one or more sample components.

In non-limiting embodiments, the disclosure provides methods for separating target and non-target analytes in a sample using an ADE and an OPI (or an essentially equivalent, "open port sampling interface (OPSI)") for an analytical instrument such as a mass spectrometer. These methods can mimic the advantages of LC-separation, including reduced or minimized ion suppression and interference, while eliminating the need for an LC system (either separate from or integrated into) combined with an analytical instrument such as, for example, a mass spectrometer. As used herein with reference to embodiments relating to mass spectrometry, "ion suppression" and "ion interference" refer to reduced signal to noise ratio (S/N) due to ionization competition between target analytes in a sample and non-target species from endogenous or exogenous sources that are not removed from the sample matrix. The methods disclosed herein reduce or minimize the co-elution of non-target species with a target analyte(s) to improve precision, accuracy, and sensitivity of an assay such as, for example, a mass spectrometry assay.

A representative system in accordance with example aspects and embodiments of the disclosure is illustrated in FIG. 1A. As with all figures referenced herein, in which like parts are referenced by like numerals, FIG. 1A is not to scale, and certain dimensions are exaggerated for clarity of presentation. In FIG. 1A, the acoustic droplet ejection (ADE) device is shown generally at 11, ejecting droplet 49 toward the continuous flow sampling probe (referred to herein as an open port interface (OPI)) indicated generally at 51 and into the sampling tip 53 thereof.

The acoustic droplet ejection device 11 includes at least one reservoir, with a first reservoir shown at 13 and an optional second reservoir 31. In some embodiments a further plurality of reservoirs may be provided. Each reservoir is configured to house a fluid sample having a fluid surface, e.g., a first fluid sample 14 and a second fluid sample 16 having fluid surfaces respectively indicated at 17 and 19. When more than one reservoir is used, as illustrated in FIG. 1A, the reservoirs are preferably both substantially identical and substantially acoustically indistinguishable, although identical construction is not a requirement.

The ADE comprises acoustic ejector 33, which includes acoustic radiation generator 35 and focusing means 37 for focusing the acoustic radiation generated at a focal point 47 within the fluid sample, near the fluid surface. As shown in FIG. 1A, the focusing means 37 may comprise a single solid piece having a concave surface 39 for focusing the acoustic radiation, but the focusing means may be constructed in other ways as discussed below. The acoustic ejector 33 is thus adapted to generate and focus acoustic radiation so as to eject a droplet of fluid from each of the fluid surfaces 17 and 19 when acoustically coupled to reservoirs 13 and 15, and thus to fluids 14 and 16, respectively. The acoustic radiation generator 35 and the focusing means 37 may function as a single unit controlled by a single controller, or they may be independently controlled, depending on the desired performance of the device.

The acoustic droplet ejector 33 may be in either direct contact or indirect contact with the external surface of each reservoir. With direct contact, in order to acoustically couple the ejector to a reservoir, it is preferred that the direct contact be wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of reservoirs that have a specially formed inverse surface.

Optimally, acoustic coupling is achieved between the ejector and each of the reservoirs through indirect contact, as illustrated in FIG. 1A. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and the underside of the reservoir. In addition, it is important to ensure that the fluid medium is substantially free of material having different acoustic properties than the fluid medium itself. As shown, the first reservoir 13 is acoustically coupled to the acoustic focusing means 37 such that an acoustic wave generated by the acoustic radiation generator is directed by the focusing means 37 into the acoustic coupling medium 41, which then transmits the acoustic radiation into the reservoir 13.

In operation, reservoir 13 and optional reservoir 15 of the device are filled with first and second fluid samples 14 and 16, respectively, as shown in FIG. 1A. The acoustic ejector 33 is positioned just below reservoir 13, with acoustic coupling between the ejector and the reservoir provided by means of acoustic coupling medium 41. Initially, the acoustic ejector is positioned directly below sampling tip 53 of OPI 51, such that the sampling tip faces the surface 17 of the fluid sample 14 in the reservoir 13. Once the ejector 33 and reservoir 13 are in proper alignment below sampling tip 53, the acoustic radiation generator 35 is activated to produce acoustic radiation that is directed by the focusing means 37 to a focal point 47 near the fluid surface 17 of the first reservoir. As a result, droplet 49 is ejected from the fluid surface 17 toward and into the liquid boundary 50 at the sampling tip 53 of the OPI 51, where it combines with solvent in the flow probe 53. The profile of the liquid boundary 50 at the sampling tip 53 may vary from extending beyond the sampling tip 53 to projecting inward into the OPI 51. In a multiple-reservoir system, the reservoir unit (not shown), e.g., a multi-well plate or tube rack, can then be repositioned relative to the acoustic ejector such that another reservoir is brought into alignment with the ejector and a droplet of the next fluid sample can be ejected. The solvent in the flow probe cycles through the probe continuously, minimizing or even eliminating "carryover" between droplet ejection events. Fluid samples 14 and 16 are samples of any fluid for which transfer to an analytical instrument is desired, where the term "fluid" is as defined earlier herein.

The structure of OPI 51 is also shown in FIG. 1A. Any number of commercially available continuous flow sampling probes can be used as is or in modified form, all of which, as is well known in the art, operate according to substantially the same principles. As can be seen in the FIG. 1A, the sampling tip 53 of OPI 51 is spaced apart from the fluid surface 17 in the reservoir 13, with a gap 55 therebetween. The gap 55 may be an air gap, or a gap of an inert gas, or it may comprise some other gaseous material; there is no liquid bridge connecting the sampling tip 53 to the fluid 14 in the reservoir 13. The OPI 51 includes a solvent inlet 57 for receiving solvent from a solvent source and a solvent transport capillary 59 for transporting the solvent flow from the solvent inlet 57 to the sampling tip 53, where the ejected droplet 49 of analyte-containing fluid sample 14 combines with the solvent to form an analyte-solvent dilution. A solvent pump (not shown) is operably connected to and in fluid communication with solvent inlet 57 in order to control the rate of solvent flow into the solvent transport capillary and thus the rate of solvent flow within the solvent transport capillary 59 as well.

Fluid flow within the OPI 51 carries the analyte-solvent dilution through a sample transport capillary 61 provided by inner capillary tube 73 toward sample outlet 63 for subsequent transfer to an analytical instrument. A sampling pump (not shown) can be provided that is operably connected to and in fluid communication with the sample transport capillary 61, to control the output rate from outlet 63. In a preferred embodiment, a positive displacement pump is used as the solvent pump, e.g., a peristaltic pump, and, instead of a sampling pump, an aspirating nebulization system is used so that the analyte-solvent dilution is drawn out of the sample outlet 63 by the Venturi effect caused by the flow of the nebulizing gas introduced from a nebulizing gas source 65 via gas inlet 67 (shown in simplified form in FIG. 1A, insofar as the features of aspirating nebulizers are well known in the art) as it flows over the outside of the sample outlet 63. The analyte-solvent dilution flow is then drawn upward through the sample transport capillary 61 by the pressure drop generated as the nebulizing gas passes over the sample outlet 63 and combines with the fluid exiting the sample transport capillary 61. A gas pressure regulator is used to control the rate of gas flow into the system via gas inlet 67. In a preferred manner, the nebulizing gas flows over the outside of the sample transport capillary 61 at or near the sample outlet 63 in a sheath flow type manner which draws the analyte-solvent dilution through the sample transport capillary 61 as it flows across the sample outlet 63 that causes aspiration at the sample outlet upon mixing with the nebulizer gas.

The solvent transport capillary 59 and sample transport capillary 61 are provided by outer capillary tube 71 and inner capillary tube 73 substantially co-axially disposed therein, where the inner capillary tube 73 defines the sample transport capillary, and the annular space between the inner capillary tube 73 and outer capillary tube 71 defines the solvent transport capillary 59.

The system can also include an adjuster 75 coupled to the outer capillary tube 71 and the inner capillary tube 73. The adjuster 75 can be adapted for moving the outer capillary tube tip 77 and the inner capillary tube tip 79 longitudinally relative to one another. The adjuster 75 can be any device capable of moving the outer capillary tube 71 relative to the inner capillary tube 73. Exemplary adjusters 75 can be motors including, but are not limited to, electric motors (e.g., AC motors, DC motors, electrostatic motors, servo motors, etc.), hydraulic motors, pneumatic motors, translational stages, and combinations thereof. As used herein, "longitudinally" refers to an axis that runs the length of the probe 51, and the inner and outer capillary tubes 73, 71 can be arranged coaxially around a longitudinal axis of the probe 51, as shown in FIG. 1A-B.

Additionally, as illustrated in FIG. 1A, the OPI 51 may be generally affixed within an approximately cylindrical holder 81, for stability and ease of handling.

Figure 1B:
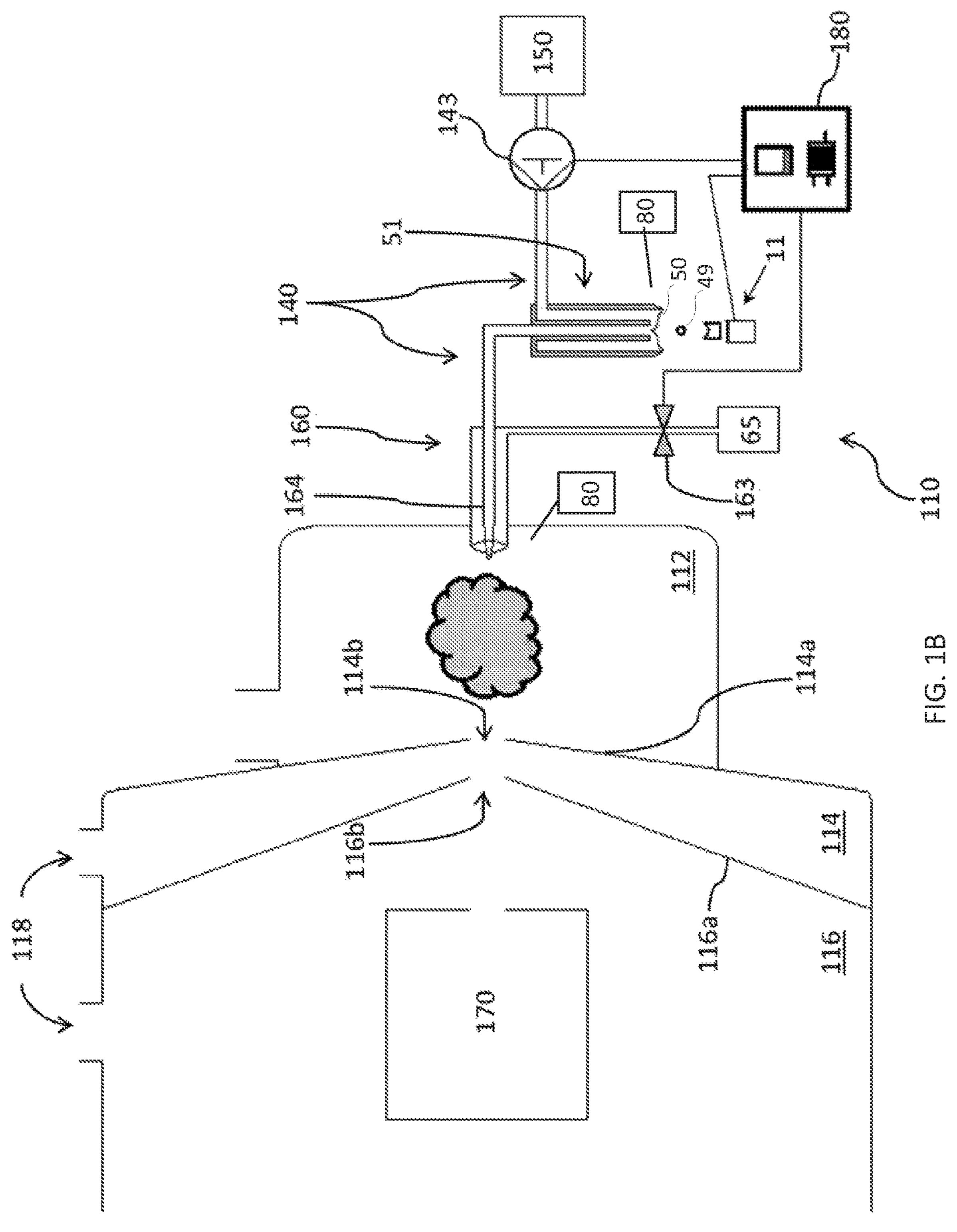

FIG. 1B schematically depicts an embodiment of an exemplary system 110 in accordance with various aspects of the applicant's teachings for ionizing and mass analyzing analytes received within an open end of a sampling probe 51, the system 110 including an acoustic droplet injection device 11 configured to inject a droplet 49, from a reservoir into the open end of the sampling probe 51. As shown in FIG. 1B, the exemplary system 110 generally includes a sampling probe 51 (e.g., an open port interface) in fluid communication with a nebulizer-assisted ion source 160 for discharging a liquid containing one or more sample analytes (e.g., via electrospray electrode 164) into an ionization chamber 112, and a mass analyzer 170 in fluid communication with the ionization chamber 112 for downstream processing and/or detection of ions generated by the ion source 160. A fluid handling system 140 (e.g., including one or more pumps 143 and one or more conduits) provides for the flow of liquid from a solvent reservoir 150 to the sampling probe 51 and from the sampling probe 51 to the ion source 160. For example, as shown in FIG. 1B, the solvent reservoir 150 (e.g., containing a liquid, desorption solvent) can be fluidly coupled to the sampling probe 51 via a supply conduit through which the liquid can be delivered at a selected volumetric rate by the pump 143 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, flow of liquid into and out of the sampling probe 51 occurs within a sample space accessible at the open end such that one or more droplets can be introduced into the liquid boundary 50 at the sample tip 53 and subsequently delivered to the ion source 160. As shown, the system 110 includes an acoustic droplet injection device 11 that is configured to generate acoustic energy that is applied to a liquid contained with a reservoir (as depicted in FIG. 1A) that causes one or more droplets 49 to be ejected from the reservoir into the open end of the sampling probe 51. A controller 180 can be operatively coupled to the acoustic droplet injection device 11 and can be configured to operate any aspect of the acoustic droplet injection device 11 (e.g., focusing means, acoustic radiation generator, automation means for positioning one or more reservoirs into alignment with the acoustic radiation generator, etc.) so as to inject droplets into the sampling probe 51 or otherwise discussed herein substantially continuously or for selected portions of an experimental protocol by way of non-limiting example.

As shown in FIG. 1B, the exemplary ion source 160 can include a source 65 of pressurized gas (e.g. nitrogen, air, or a noble gas) that supplies a high velocity nebulizing gas flow which surrounds the outlet end of the electrospray electrode 164 and interacts with the fluid discharged therefrom to enhance the formation of the sample plume and the ion release within the plume for sampling by **114*b* and 116*b*, e.g., via the interaction of the high speed nebulizing flow and jet of liquid sample (e.g., analyte-solvent dilution). The nebulizer gas can be supplied at a variety of flow rates, for example, in a range from about 0.1 L/min to about 20 L/min, which can also be controlled under the influence of controller 180 (e.g., via opening and/or closing valve 163). In accordance with various aspects of the present teachings, it will be appreciated that the flow rate of the nebulizer gas can be adjusted (e.g., under the influence of controller 180) such that the flow rate of liquid within the sampling probe 51 can be adjusted based, for example, on suction/aspiration force generated by the interaction of the nebulizer gas and the analyte-solvent dilution as it is being discharged from the electrospray electrode 164** (e.g., due to the Venturi effect).

In the depicted embodiment, the ionization chamber 112 can be maintained at an atmospheric pressure, though in some embodiments, the ionization chamber 112 can be evacuated to a pressure lower than atmospheric pressure. The ionization chamber 112, within which the analyte can be ionized as the analyte-solvent dilution is discharged from the electrospray electrode 164, is separated from a gas curtain chamber 114 by a plate **114*a* having a curtain plate aperture 114*b*. As shown, a vacuum chamber 116, which houses the mass analyzer 170, is separated from the curtain chamber 114 by a plate 116*a* having a vacuum chamber sampling orifice 116*b*. The curtain chamber 114 and vacuum chamber 116 can be maintained at a selected pressure(s) (e.g., the same or different sub-atmospheric pressures, a pressure lower than the ionization chamber) by evacuation through one or more vacuum pump ports 118**.

It will also be appreciated by a person skilled in the art and in light of the teachings herein that the mass analyzer 170 can have a variety of configurations. Generally, the mass analyzer 170 is configured to process (e.g., filter, sort, dissociate, detect, etc.) sample ions generated by the ion source 160. By way of non-limiting example, the mass analyzer 170 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-$Q_{linear}$ ion trap (Q TRAP®) mass spectrometer," authored by James W. Hager and J. C. Yves Le Blanc and published in Rapid Communications in Mass Spectrometry (2003; 17:1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance other suitable mass spectrometers include single quadrupole, triple quadrupole, ToF, trap, and hybrid analyzers. It will further be appreciated that any number of additional elements can be included in the system 110 including, for example, an ion mobility spectrometer (e.g., a differential mobility spectrometer for ion selection) that is disposed between the ionization chamber 112 and the mass analyzer 170 and is configured to separate ions based on their mobility through a drift gas in high- and low-fields rather than their mass-to-charge ratio). Additionally, it will be appreciated that the mass analyzer 170 can comprise a detector that can detect the ions which pass through the analyzer 170 and can, for example, supply a signal indicative of the number of ions per second that are detected.

In accordance with the aspect and embodiments of the disclosure, an acoustic signal can be detected and/or monitored in one or more regions of the sampling system. In example embodiment in accordance with FIGS. 1A-1B the signal may be detected and/or monitored by a detection device or acoustic transducer 80, at or near the sampling interface region generally in the area of the liquid boundary 50, sampling tip 53, and/or gap 55, at a receiving end of a sample transport capillary (e.g., 61, 73, 77, 79) and/or at the opposite end of the fluid handling system (e.g., outlet 63 of transport capillary in FIG. 1A, 140 in FIG. 1B) that transfers sample to a secondary device such as an ionization chamber 112, an ion source 160, and/or an electrospray electrode 164 (e.g., as depicted in the example embodiment of FIG. 1B).

In some embodiments, the methods can include differential mobility spectrometry (DMS), which may also be referred to as Field Asymmetric Waveform Ion Mobility Spectrometry (FAIMS) or Field Ion Spectrometry (FIS). DMS typically performs gas-phase ion sample separation and analysis by continuously transmitting ions-of-interest while filtering out unwanted/non-selected species. In accordance with the example aspects and embodiments of the disclosure, a DMS can be interfaced with a mass spectrometer (MS (e.g., an ADE/OPI MS)) to take advantage of the atmospheric pressure, gas-phase, and continuous ion separation capabilities of the DMS and the detection accuracy of the MS. The combination of a DMS with an MS has enhanced numerous areas of complex sample analysis, including proteomics, peptide/protein conformation, pharmacokinetics, and metabolic processes. In addition to pharmaceutical and biotech applications, DMS-based analyzers have been used for trace level explosives detection and petroleum monitoring.

A DMS separates and analyzes ions based on the mobility characteristics of the ions rather than based on the mass-to-charge ratio as in MS. Specifically in DMS, ions within a drift gas can be continuously sampled, between two parallel electrodes that generate an asymmetric electric field (S or separation field) therebetween that tends to move the ions in a direction perpendicular to the direction of the drift gas flow (i.e., toward the electrodes). The asymmetric field(S) can be generated by applying an electrical signal(s) (e.g., RF voltages) to one or more of the electrodes so as to generate an asymmetric waveform, the amplitude of which is referred to as the SV (separation voltage). Typically, the DMS is in fluid communication with a mass spectrometer in any variety of configurations that are generally known and described in the art (see, e.g., U.S. Pat. No. 8,084,736, US2019/0113478 and US2019/0086363 all of which are incorporated herein by reference). Suitably, the DMS is configured to resolve ions (e.g., ionized isobaric species) based on their mobility through a fixed or variable electric field. As such, the DMS can comprise any ion mobility device configured to separate ions based on their mobility through a carrier or drift gas, including by way of non-limiting example, an ion mobility spectrometer, a drift-time ion mobility spectrometer, a traveling-wave ion mobility spectrometer, a differential mobility spectrometer, and a high-field asymmetric waveform ion mobility spectrometer (FAIMS) of various geometries such as parallel plate, curved electrode, spherical electrode, micromachined FAIMS, or cylindrical FAIMS device, among others.

In an aspect, the disclosure provides a method comprising: combining separation media with a sample solution; separating the separation media from the sample solution; retaining the separation media in a reservoir containing an eluent to form an eluent solution having an eluent concentration; generating a synthetic chromatogram by repeatedly: ejecting a volume of eluent solution from the reservoir into a sampling interface, capturing the volume of eluent solution with the sampling interface and transferring the captured volume to a mass spectrometer for mass analysis, mass analyzing eluent ions, and increasing the eluent concentration of the eluent solution until a target concentration is reached.

In another aspect, the disclosure provides a method comprising: combining separation media with a sample solution; separating the separation media from the sample solution; retaining the separation media in a plurality of reservoirs, each reservoir containing a different concentration of an eluent to form a plurality of eluent solutions at different eluent concentrations; generating a synthetic chromatogram by: sequentially ejecting from each reservoir of the plurality of reservoirs a volume of eluent solution into a sampling interface, capturing the volume of eluent solution with the sampling interface and transferring the captured volume to a mass spectrometer to generate eluent ions for mass analysis, and mass analyzing the eluent ions.

In embodiments in accordance with the above aspects, the disclosure comprises combining one or more separation media with a sample solution. The separation media can comprise any solid separation media generally known and available in the art, and suitably media comprising resins, beads, or other micro or nano-structures that comprise ceramics, glasses, metals, and/or polymers, that have functional groups or moieties that can interact with one or more target analytes that may be present in a sample (e.g., active surface coatings or resins). The separation media can be selected based on a physical property that can distinguish and separate one or more components present in a sample (e.g., binds a target analyte(s) and does not bind sample matrix/buffer), based on molecular size, shape, charge, or hydrophobicity, or based on binding affinity to e.g., an antibody, a small molecule, or a macromolecule. In some embodiments, the separation media can comprise an ion exchange moiety (e.g., amine and/or carboxylate functional groups), a chelating moiety, a hydrophobic moiety (e.g., H.I.C. media), an affinity moiety (e.g., immunoaffinity), a carbohydrate moiety, or a size exclusion media, and the like. In some further embodiments, the separation media comprises a particle (e.g., bead) that can be manipulated by one or more external forces such as, for example, a magnetic core. In some embodiments, the separation media comprises one or more magnetic beads or particles having a size of about 100 μm or less. In such embodiments, mixing and retaining steps can comprise applying a magnetic field to separation media contained in the reservoir(s).

In embodiments, the combining of the sample solution with the one or more separation media comprises contacting the sample solution with the separation media under conditions that are effective to allow for binding of one or more components in the sample solution (e.g., a target analyte) to the separation media. Such conditions can be readily determined by one of skill in the art taking into consideration such factors as, for example, the characteristics of the sample and the characteristics of the specific type of separation media utilized in the method. The contacting and combining may comprise incubating the separation media and sample for a period of time (e.g., seconds to minutes), agitating (e.g., mixing or stirring) the media and sample, adjusting temperature, and the like, to help ensure adequate contacting is made between the sample and separation media. In some embodiments, the methods can comprise more than one separation media that target sample components based on different physical and/or chemical characteristics of the targeted sample components.

The methods described herein comprise removing or separating the separation media from the sample solution and contacting the separation media (e.g., mixing) with an eluent. In some embodiments the separation media is retained in or separated to a region of a reservoir (e.g., sample well, etc.). In some embodiments, the separation media is removed from the reservoir containing the sample and is added to a separate reservoir comprising an amount of eluent in an eluent solution. In these embodiments, the retaining, separating, or removing may be performed prior to the addition of eluent, allowing for a volume of the sample solution after contact with the separation media to be removed for analysis.

The eluent is suitably provided as an eluent solution having a known concentration of eluent, so that a concentration of eluent when mixed with the separation media can be determined. In some embodiments, the eluent solution may be added to the reservoir comprising the separation media in a series of separate additions that are effective to increase the total concentration of eluent in the eluent solution. Some further embodiments may comprise addition of a volume of eluent solution from a concentrated eluent stock solution. After each of the additions of eluent solution, one or more volumes of the eluent solutions may be analyzed for the presence, concentration, and/or amount of one or more sample components (e.g., target analyte(s)). The addition of eluent solution can be performed using any platform or technique (e.g., automated or manual addition of volumes). In exemplary embodiments, solutions (e.g., sample, eluent, separation media/eluent mixtures) may be transferred (e.g., removed, injected, or ejected) using liquid transfer techniques generally known in the art such as, for example, techniques comprising a microinjector, a nanoinjector, an inkjet printer nozzle, or, in some preferable embodiments, an acoustic droplet ejector (ADE). While the transferred volumes may vary, and as discussed herein, typical volumes of transferred solutions fall within a range of about 2.5 nL to about 500 nL.

Typically, the volume of eluent solution added is a known volume and may be, for example, a volume that is greater than, less than, or equal to the volume of any liquid sample removed from a reservoir prior to the addition of eluent solution. In some embodiments of the methods, the amount of eluent solution added to a reservoir is about equal to the volume of any liquid removed from the reservoir (e.g., ejected) prior to the addition of the eluent solution, such that the total volume of liquid retained in the one or more reservoirs about the same over the course of performing the method (i.e., starting volume in the reservoir is the same, or about the same, as the final volume in the reservoir).

In some embodiments a series of reservoirs are prepared with each reservoir in the series (i.e., plurality of reservoirs) comprising an eluent solution having a concentration of eluent that is different from each of the other reservoirs (e.g., increasing or decreasing eluent concentrations). In such embodiments, the methods may comprise addition of an amount, for example and equivalent amount, of separation media (e.g., a known amount of separation media/volume comprising separation media) to each of the reservoirs comprising the eluent solutions. In such embodiments, the method may optionally further comprise adding additional volume(s) of eluent solution to one or more of the reservoirs. Volumes from each of the reservoirs can be analyzed for the presence or absence of one or more components (e.g., target analyte(s)) in the sample.

The eluent in the eluent solutions can comprise any molecule, or composition comprising a molecule that, when added to a separation media, can bind (e.g., competitively bind) to the separation media and elute or displace the one or more components from the sample solution bound to the separation media, thereby making the eluted or displaced component(s) available for analysis in the one or more volumes of eluent solution that is sampled (e.g., ejected). In some non-limiting embodiments, the eluent comprises an organic molecule, an ionic (salt) solution, a low pH buffer solution (e.g., pH 2-6), a high pH buffer solution (e.g., pH 8-12), affinity partners including for example, immunoglobulins, specific binding partners (e.g., antigen/antibody, enzyme/substrate, receptor/ligand, biotin/avidin, protein/nucleic acid, aptamers, fusion protein glutathione), partners (e.g., HIS-tags/Ni-agarose, etc.), carbohydrates (e.g., lectins/polysaccharides), and the like. In embodiments, the eluent can comprise a higher binding affinity (e.g., binding constant) for the separation media than the one or more components (target analyte(s)) in the sample.

As disclosed herein, the methods comprise the analysis of volumes of separation media/eluent solution mixtures that are removed from the mixtures and analyzed/sampled over a range of eluent concentrations. The analysis can comprise removing a volume (e.g., ejecting the volume, injecting the volume, withdrawing the volume) from the separation media/eluent solution mixture and delivering it to a sampling interface before and after any subsequent addition of eluent solution. In accordance with some embodiments described herein, the volume may be ejected using, for example, an ADE and the volume may be captured by, for example, an OPI or an acoustic mist ionization interface.

In embodiments, the volume of eluent solution and separation media mixture that is removed for analysis may vary. In some suitable embodiments, the volume removed may be ejected from the reservoir. In such embodiments, the volume may be ejected as one or more discrete droplets of a volume that can be set, for example, in a range from about 2.5 nL to about 500 nL.

Figure 2B:
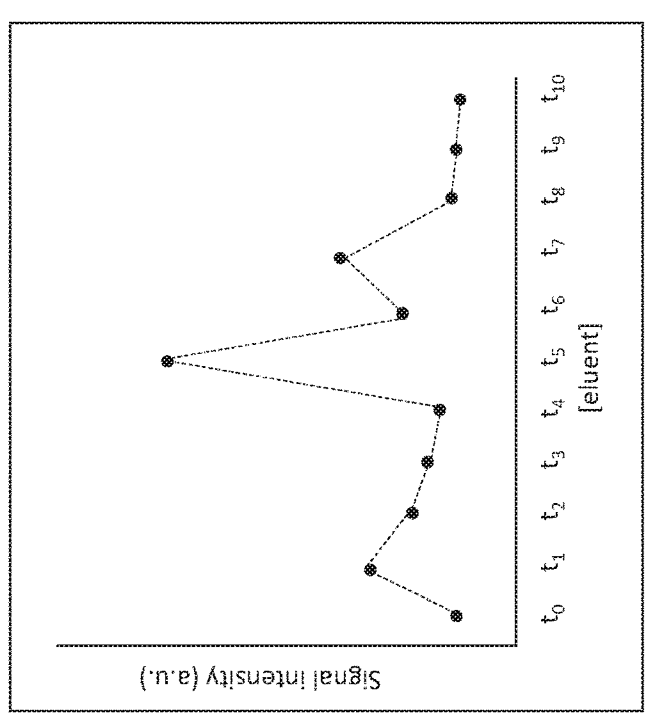
Figure 2B:
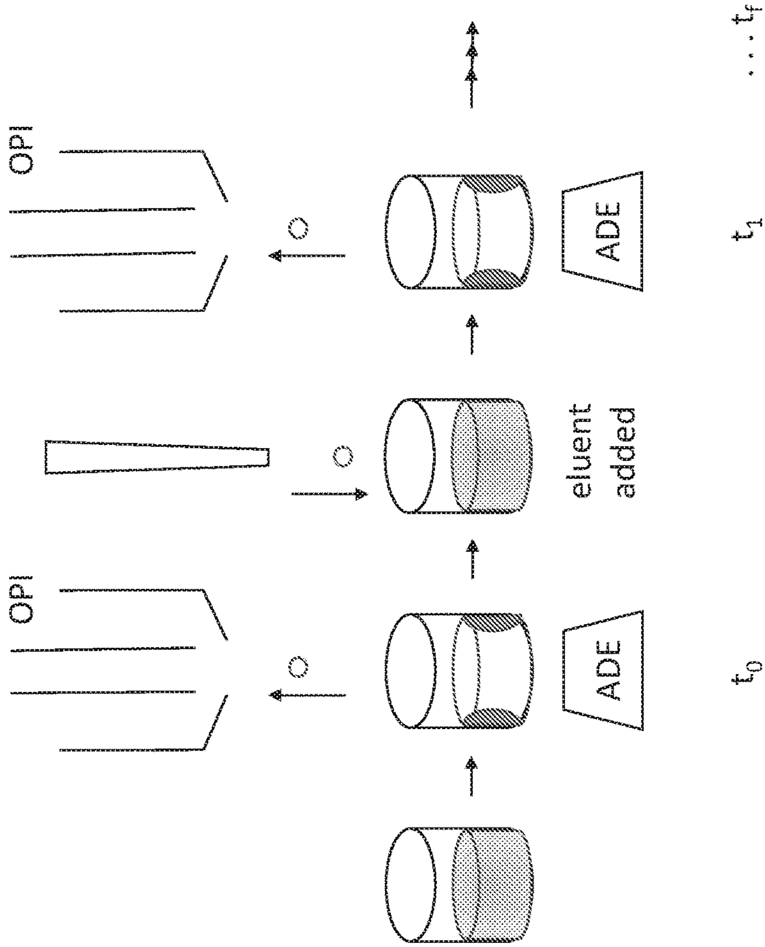

In embodiments that include ejecting eluent solution from one or more reservoirs using ADE, the ejection of droplets from one or more reservoirs at various eluent solution concentrations can be ejected as rapid pulses, generating a sharp peak, or can be ejected as continuous droplets to acquire more sample data, and generating longer signal duration. In accordance with such embodiments, FIGS. 2A-2B provide an overview of one embodiment of a method workflow falling within the scope of the disclosure. First, a reservoir comprising separation media and sample are combined under conditions that allow for binding between sample components and the separation media. As an ADE and OPI are positioned to the reservoir, the separation media can be retained by moving/containing (e.g., by application of magnetic field) the media to one or more regions of the reservoir prior to acoustic ejection (ADE) of one or more sample droplets into the OPI. This ejection and sampling can be identified as time 0 ($t_0$). Following the initial sampling, an amount of eluent is added to the sample and separation media, preferably in a volume that is about equal to the volume of sample ejected at to. The eluent solution formed in the reservoir is combined with the separation media to allow for elution of sample components bound to the separation media. As the ADE and OPI are re-positioned to the reservoir, the separation media can be retained in the reservoir prior to acoustic ejection (ADE) of one or more sample droplets of the eluent solution into the OPI. This ejection and sampling can be identified as time 1 ($t_1$). These series of steps may be repeated as many times and at as many eluent concentrations as necessary (e.g., $t_2$, $t_3$, $t_4$, $t_5$, $t_6$, $t_7$, . . . time final $t_f$) to generate the desired simulated chromatogram for each sample to be analyzed.

The analysis used in accordance with the aspects and embodiments may comprise any one or more known technique that may be useful in identifying, detecting, characterizing, and/or quantifying the components that are present in the sampled volumes. In some embodiments the analysis may comprise one or more spectrometers, spectrophotometers, spectrographs, or spectral analyzers, and include one or more techniques comprising UV-Vis, IR, near-IR, Raman, fluorescence, absorption spectroscopy (e.g., atomic absorption), emission spectroscopy (e.g., ICP-AES), EPR, NMR, and mass spectrometry (MS). In some embodiments the analysis comprises a MS comprising any ion source known in the art, including for example, an electrospray ionization (ESI) source, and wherein the mass spectrometer is operatively coupled to the sampling interface.

The methods disclosed above effectively employ varying concentrations of eluent solution to titrate the separation media until the one or more target analytes bound to the separation media is detectable in the sampled volume(s) of eluent solution and separation media mixtures.

In any of the methods disclosed herein, the separation of target and non-target analytes in a sample is similar to step elution LC. Advantageously, these methods can simultaneously measure multiple samples (i.e. high throughput) and eliminate or at least reduce sample carry-over, without the need for an LC system.

EXAMPLES

Format A. Serial Addition of Eluent to Sample.

A sample solution is added to a reservoir, or a plurality of samples are added to a plurality of reservoirs (e.g. 24 wells on a well plate). A liquid handling machine adds separation media, (e.g., magnetic C18 beads) to the reservoirs containing sample. The beads and sample are mixed and optional additional liquid (e.g., sample matrix) may be added the reservoirs, leaving a determined and/or measurable known volume (e.g., 5-500 μL) of aqueous solution and beads. For each reservoir containing beads and sample, the beads and sample can be mixed for a time sufficient to bind to one or more target analytes present in the sample. Once mixed, a magnetic field may be applied to the reservoirs to retain the magnetic beads in the reservoir. A volume of the sample solution is ejected (e.g., a volume (200 nL) via an ADE) to a sampling interface (e.g., OPI) at a known rate and is measured by an analytical device operatively coupled to the sampling interface (e.g., ≥1 well/second into an OPI operatively coupled to a mass spectrometer). The resulting measurement (e.g., mass spectrum) is equivalent to a cycle number (e.g., time zero) on an LC gradient run, but the method allows for all samples to be measured nearly simultaneously, with no carry-over between samples.

To simulate a gradient elution profile, a volume of eluent can be added (e.g., 200 nL of organic solvent via an inkjet printer nozzle can be added to each well), the measurement repeated, followed by another added volume of eluent, the measurement repeated, etc., to form a series of eluent solutions. The eluent solutions comprise known eluent concentrations, which can elute some sample components (e.g., target analytes) that bind to the C18 beads, and which are measured by, e.g., mass spec analysis. The beads and eluent solution are mixed (e.g., magnetically stirred), and another volume of eluent solution is ejected from each reservoir (e.g., by ADE) into the sampling interface, as above, to generate a subsequent measurement or cycle. This series of eluent addition and sampling can be repeated until the desired eluent concentration is achieved or until no additional sample components are eluted from the separation media.

Format B. Addition of Separation Media to Eluent Solutions of Differing Eluent Concentration.

To a sample, separation media (e.g., C18 magnetic beads) is added and mixed for a period of time that is sufficient to bind target analytes that are present in the sample. A series of reservoirs are prepared using known volumes of eluent solutions having different known eluent concentrations. Aliquots of the separation media are added to each of the reservoirs containing eluent solutions. The separation media (e.g., C18 beads) and eluent solutions are mixed, leaving a determined and/or measurable known volume (e.g., 5-500 μL) of eluent solution and separation media. For each reservoir the media and eluent solution, a magnetic field may be applied to retain the magnetic beads in the reservoir. A volume of the eluent solution from each of the reservoirs is ejected (e.g., a volume (200 nL) via an ADE) to a sampling interface (e.g., OPI) at a known rate and is measured by an analytical device operatively coupled to the sampling interface (e.g., ≥1 well/second into an OPI operatively coupled to a mass spectrometer). For each sample in the series of solutions comprising different eluent concentrations, any resulting analyte measured by the analytical device (e.g., mass spectrometer) may be correlated to the eluent solution concentration, and depicted as an LC gradient run (e.g., analyte presence as a function of eluent concentration). The method allows for all samples to be measured nearly simultaneously, with no carry-over between samples.

Format C. Serial Transfer and Addition of Separation Media to Eluent Solutions of Differing Eluent Concentration.

A sample solution is added to a reservoir, or a plurality of samples are added to a plurality of reservoirs (e.g. 24 wells on a well plate). A liquid handling machine adds separation media, (e.g., magnetic C18 beads) to the reservoirs containing sample. The beads and sample are mixed and optional additional liquid (e.g., sample matrix) may be added the reservoirs, leaving a determined and/or measurable known volume (e.g., 5-500 μL) of aqueous solution and beads. For each reservoir containing beads and sample, the beads and sample can be mixed for a time sufficient to bind to one or more target analytes present in the sample. A series of reservoirs are prepared using known volumes of eluent solutions having different known eluent concentrations.

Once mixed, a magnetic field may be applied to the reservoirs to retain the magnetic beads in the reservoir. A volume of the sample solution is ejected (e.g., a volume (200 nL) via an ADE) to a sampling interface (e.g., OPI) at a known rate and is measured by an analytical device operatively coupled to the sampling interface (e.g., ≥1 well/second into an OPI operatively coupled to a mass spectrometer). The resulting measurement (e.g., mass spectrum) is equivalent to a cycle number (e.g., time zero) on an LC gradient run.

To simulate a gradient elution profile, an aliquot of the separation media may be added to the reservoir containing the eluent solution at the lowest eluent concentration. The added separation media and eluent solution are mixed, a volume of eluent solution is ejected and measured as above, and another aliquot of the same separation media is added to the reservoir containing eluent solution at the second lowest eluent concentration, and another measurement is performed. In this format, aliquots of the same separation media are repeatedly added to the series of eluent solutions, in order of concentration, and measurements are repeated until the separation media is added to the last eluent solution and a final measurement is made. This serial addition of aliquots of separation media to eluent solutions of differing eluent concentrations can be repeated until the desired eluent concentration is achieved or until no additional sample components are eluted from the separation media.

For each measurement of sample in the series of solutions comprising different eluent concentrations, any resulting analyte measured by the analytical device (e.g., mass spectrometer) may be correlated to the eluent solution concentration, and depicted as an LC gradient run (e.g., analyte presence as a function of eluent concentration).

While the present disclosure has been described with reference to certain embodiments, it will be understood by those skilled in the art that various changes may be made and equivalents may be substituted without departing from the scope of the present disclosure or appended claims. In addition, many modifications may be made to adapt a particular situation or material to the teachings of the present disclosure without departing from its scope. Therefore, it is intended that the present disclosure not be limited to the particular embodiments disclosed, but that the present disclosure will include all aspects falling within the scope of the appended claims.

All patents, patent applications, publications, and descriptions mentioned above are herein incorporated by reference in their entirety.

We claim:

1. A method comprising:

combining separation media with a sample solution;

separating the separation media from the sample solution;

retaining the separation media in a reservoir containing an eluent to form an eluent solution having an eluent concentration;

generating a synthetic chromatogram by repeatedly:

ejecting a volume of eluent solution from the reservoir into a sampling interface, capturing the volume of eluent solution with the sampling interface and transferring the captured volume to a mass spectrometer for mass analysis, mass analyzing eluent ions, and increasing the eluent concentration of the eluent solution until a target concentration is reached.

2. The method of claim 1, wherein the volume of eluent solution is ejected using an acoustic droplet ejector (ADE), a microinjector, a nanoinjector, or an inkjet printer nozzle.

3. The method of claim 1, wherein increasing the eluent concentration of the eluent solution comprises adding eluent to the eluent solution.

4. The method of claim 1, wherein increasing the eluent concentration of the eluent solution further comprises mixing the separation media.

5. The method of claim 1, wherein combining separation media with sample solution further comprises mixing.

6. The method of claim 1, wherein retaining the separation media in a reservoir or a plurality of reservoirs containing an eluent further comprises mixing.

7. The method of claim 4, wherein the mixing comprises electromagnetic mixing, mechanical agitation, or acoustic agitation to the reservoir.

8. The method of claim 1, wherein the sampling interface comprises an open port interface (OPI).

9. The method of claim 1, wherein the ejecting comprises ejecting one or more discrete droplets of eluent solution.

10. The method of claim 1, wherein the capturing the volume of eluent solution further comprises diluting the captured volume of eluent solution.

11. The method of claim 1, wherein the separation media comprises a solid phase media, a microparticle, a nanoparticle, a magnetic particle, an ion exchange moiety, a chelating moiety, a hydrophobic moiety, an affinity moiety, or a size exchange moiety.

12. The method of claim 11, wherein the separation media comprises a solid phase media that comprises a particle comprising an active surface coating or a resin.

13. The method of claim 1, wherein the retaining step comprises applying a magnetic field to the sample reservoir.

14. The method of claim 1, wherein the eluent comprises an organic compound, an ionic solution, or a binding agent that binds to an affinity resin.

15. The method claim 1, wherein increasing the concentration of the eluent solution comprises adding eluent using an acoustic ejector, a microinjector, a nanoinjector, or an inkjet printer nozzle.

16. The method of claim 1, wherein the reservoir or plurality of reservoirs comprises a sample well plate operatively configured to an ADE.

17. The method of claim 1, wherein the method separates two or more components in the sample solution.

18. A method comprising:

combining separation media with a sample solution;

separating the separation media from the sample solution;

retaining the separation media in a plurality of reservoirs, each reservoir containing a different concentration of an eluent to form a plurality of eluent solutions at different eluent concentrations;

generating a synthetic chromatogram by:

sequentially ejecting from each reservoir of the plurality of reservoirs a volume of eluent solution into a sampling interface, capturing the volume of eluent solution with the sampling interface and transferring the captured volume to a mass spectrometer to generate eluent ions for mass analysis, and mass analyzing the eluent ions.

19. The method of claim 18, wherein the sampling interface comprises an open port interface (OPI).

20. The method of claim 18, wherein the volume of eluent solution is ejected using an acoustic droplet ejector (ADE), a microinjector, a nanoinjector, or an inkjet printer nozzle.

* * * * *